2 Sheets Sheet 1

Charles Alden.

Imp'n in Evaporating Moisture from Animal & Vegetable Substances.

No. 4,592. Reissued Oct. 17, 1871.

Witnesses.
C. Wahlert
E. F. Kastenhuber

Charles Alden Inventor.
By Van Santvoord & Hauff
his Attys

THE NORRIS PETERS CO., WASHINGTON, D. C.

Charles Alden.

Imp^t in Evaporating Moisture from Animal & Vegetable Substances.

Sheet 2.

Reissued Oct. 17, 1871.

No. 4,592.

Witnesses
C. Wahlers
S. F. Kastenhuber

Charles Alden Inventor.
By Van Santvoord & Hauff his atty

THE NORRIS PETERS CO., WASHINGTON, D. C.

UNITED STATES PATENT OFFICE.

CHARLES ALDEN, OF NEWBURG, NEW YORK, ASSIGNOR OF PART INTEREST TO ALDEN FRUIT PRESERVING COMPANY.

IMPROVEMENT IN TREATING VEGETABLE AND ANIMAL SUBSTANCES SO AS TO DRY AND PRESERVE THEM.

Specification forming part of Letters Patent No. 100,835, dated March 15, 1870; reissue No. 4,011, dated June 7, 1870; reissue No. 4,287, dated March 7, 1871; reissue No. 4,592, dated October 17, 1871.

*To all whom it may concern:*

Be it known that I, CHARLES ALDEN, of Newburg, in the county of Orange and State of New York, have invented a new and useful Improvement in Treating Vegetable and Animal Substances to Dry and Preserve them; and I do hereby declare the following to be a full, clear, and exact description thereof, which will enable those skilled in the art to make and use the same, reference being had to the accompanying drawing forming part of this specification, in which drawing—

Figure 1:
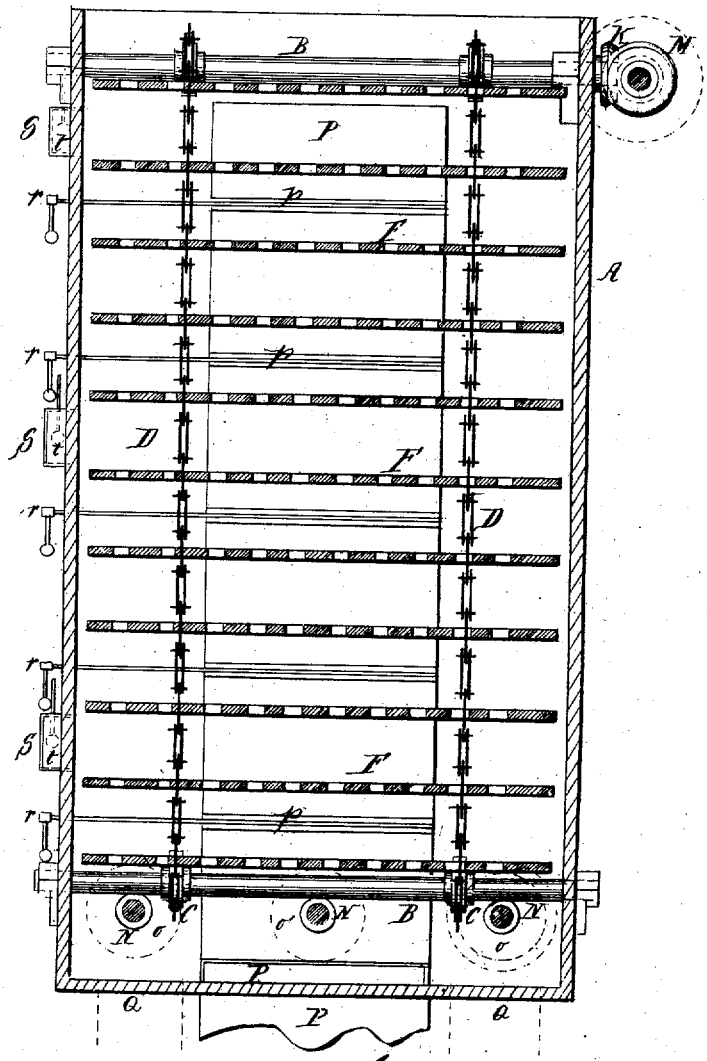
Figure 3:
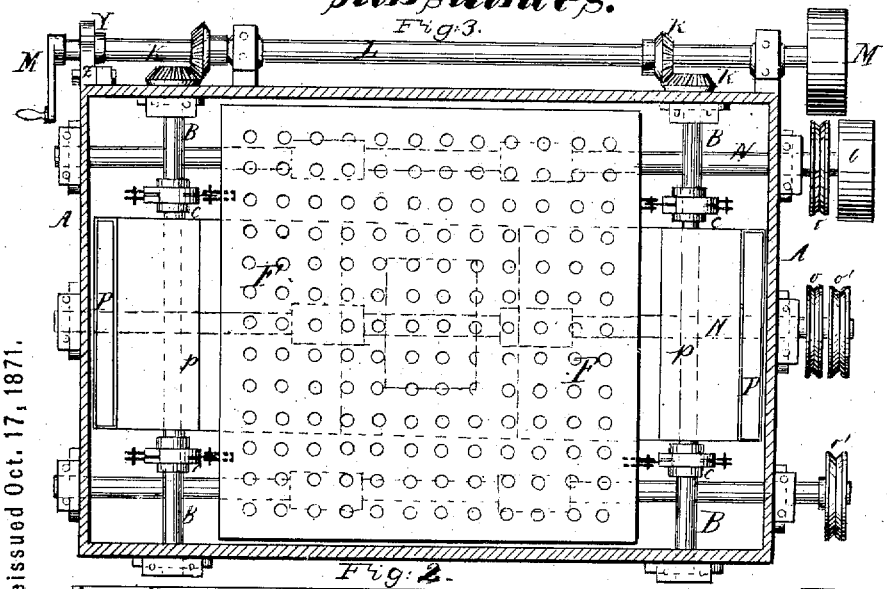
Figure 2:
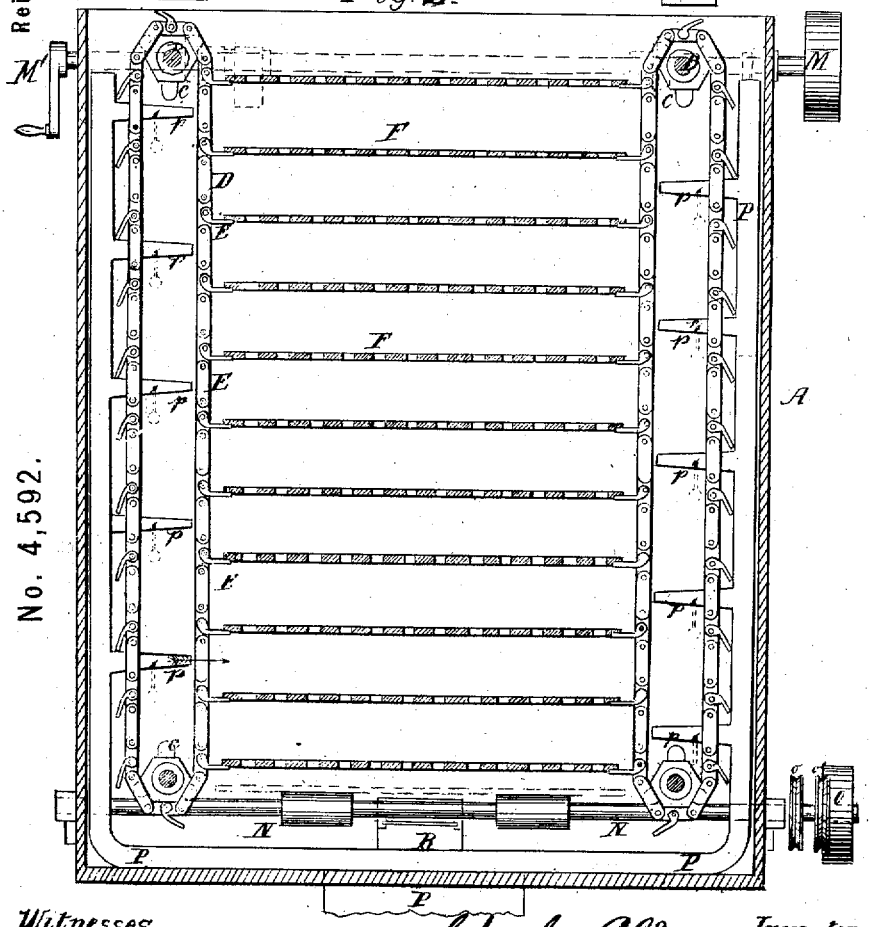

Figure 1 represents a transverse vertical section of the apparatus which may be used in carrying out this invention. Fig. 2 is a longitudinal vertical section of the same. Fig. 3 is a horizontal section of the same.

Similar letters indicate corresponding parts.

This invention consists in evaporating the moisture from vegetable and animal substances by exposing the same on rising and falling platforms or trays to a current or currents of air passing in, through, and among the material spread on said trays or platforms.

When applied to fruits or vegetables this process may be termed a supermaturing process since, by its action, the natural maturing process is continued, and the product obtained is superior in sweetness to fruits or vegetables dried in the ordinary manner.

In carrying out this invention the substances from which the moisture is to be evaporated are spread upon platforms, F, which are placed one above the other in the interior of a trunk or chamber, A, and which may be made to rest on supports E secured to endless chains D D, which run over chain-wheels C C, mounted on shafts B B, having their bearings on the side of the trunk or chamber. Said platforms or trays are perforated with small holes to allow a free circulation of the air, and if the chain-wheels are caused to revolve a rising or falling motion is imparted to the platforms. The motion of the chain-wheels is derived from the driving-shaft L, which is driven either by a hand-crank, M′, or by a pulley, M, said shaft being connected with the chain-shafts B B by means of gear-wheels K and a stop-pawl, Z, which, engaging with a ratchet-wheel, Y, mounted on the driving-shaft L, serves to arrest the chain at any desired point. The chain-wheels C C at the bottom of the trunk are driven simply by chains, and if the trunk is high the chains are steadied by intermediate guide-rollers. Each of the platforms on reaching the bottom of the trunk is deposited upon the conveyer N which receives motion by a pulley O, and small belt-wheels *o o′*; and by this conveyer the successive platforms are carried out of the trunk, so that they can be readily removed and again introduced at the top of the trunk. Through the bottom of the trunk extends an air-pipe, P, which connects with a fan-blower, so as to inject a current of hot or cold air into the trunk A. Said air-pipe may be made with two branches extending up on the sides of the trunk A, and provided with nozzles *p* for the discharge of the air. The current or currents of air thus injected in, through, and among the material spread on the platforms can be regulated by dampers. If hot air is used suitable thermometers, *t*, may be applied in boxes S attached to the sides of the trunk to regulate the temperature if desired. Flues Q Q extending through the bottom of the trunk A, serve to introduce currents of air whereby the temperature in the trunk may be regulated. As the material spread on the platforms or trays is gradually moved down in the trunk it becomes exposed to the action of the current or currents of air and the moisture is rapidly expelled. The material on being introduced at the top of the trunk reduces the temperature of the air, and as the platforms descend the material is gradually advanced toward a higher temperature, and the process of evaporating the moisture, particularly from fruits or vegetables, can be effected with a success not obtained by any other known process. At the same time by this process, which, on account of its effect, may well be called supermaturing process, the chemical nature of the product is changed, as will be seen from the subjoined analyses of apples, where column No. 1 relates to fresh apples, No. 2 to apples dried in the ordinary manner, and column No. 3 to apples dried by the Alden process:

*Analysis of Apples.*

| | No. 1. | No. 2. | No. 3. |
|---|---|---|---|
| Water | 82.23 | 12.42 | 16.62 |
| Cellulose insoluble in water, (fibrous skeleton) | 1.92 | 10.54 | 10.22 |
| Proteine, (analogous to albumen) | .15 | .80 | .76 |
| Amylaceous cellulose, (analogous to starch) | 6.59 | 30.95 | 29.75 |
| Pectine, (analogous to gelatine) | 2.47 | 11.35 | 10.88 |
| Bassorine, (gummy) | 1.35 | 7.22 | 4.33 |
| Acids—tartaric, citric, formic, malic, traces of oxalic | 1.34 | 4.88 | 3.43 |
| Grape sugar | 3.75 | 18.75 | 23.08 |
| Chlorophyl and extracts | .3 | .12 | .15 |
| Mineral matter | .17 | .87 | .78 |
| Essential ethyls, imponderable traces | 00.00 | 00.00 | 00.00 |
| Dextrine | 00.00 | 2.10 | 00.00 |
| | 100.00 | 100.00 | 100.00 |

What I claim as new, and desire to secure by Letters Patent, is—

1. The within-described process of evaporating the moisture from animal and vegetable substances by exposing said substances on rising and falling platforms to a current or currents of air, substantially as set forth.

2. Saccharified fruit, obtained by exposing fruits to a saccharifying or supermaturing process, substantially such as herein described.

CHARLES ALDEN.

Witnesses:
W. HAUFF,
E. F. KASTENHUBER.

(58)